(12) United States Patent
Yokoyama

(10) Patent No.: US 6,456,660 B1
(45) Date of Patent: Sep. 24, 2002

(54) DEVICE AND METHOD OF DETECTING MOTION VECTORS

(75) Inventor: Yutaka Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/233,540

(22) Filed: Jan. 20, 1999

(30) Foreign Application Priority Data

Jan. 20, 1998 (JP) ............................................ 10-008975

(51) Int. Cl.$^7$ ................................................. H04B 1/66
(52) U.S. Cl. ................. 375/240.16; 382/236; 348/416.1
(58) Field of Search ........................... 348/407.1, 402.1, 348/413.1, 414.1, 416.1, 417.1, 418.1, 431.1, 699, 458, 384.1, 208, 219; 375/240.16, 240.25, 240.24, 240.09; 382/242, 243, 236, 268, 232, 239, 240

(56) References Cited

U.S. PATENT DOCUMENTS

| | | | | |
|---|---|---|---|---|
| 5,157,732 A | * | 10/1992 | Ishii et al. ............. | 375/240.16 |
| 5,237,405 A | * | 8/1993 | Egusa et al. ................. | 348/208 |
| 5,351,083 A | * | 9/1994 | Tsukagoshi ................. | 348/384 |
| 5,610,658 A | * | 3/1997 | Uchida et al. ............... | 348/416 |
| 5,793,443 A | * | 8/1998 | Aoki et al. .................. | 348/699 |
| 5,946,044 A | * | 8/1999 | Kondo et al. ................ | 348/458 |
| 6,078,618 A | * | 6/2000 | Yokoyama et al. ......... | 375/240 |
| 6,167,090 A | * | 12/2000 | Iizuka .................... | 375/240.16 |

* cited by examiner

Primary Examiner—Chris Kelley
Assistant Examiner—Gims Philippe
(74) Attorney, Agent, or Firm—Scully, Scott Murphy & Presser

(57) ABSTRACT

A motion vector detection device is provided that can suitably detect motion vectors by setting an optimum search range of vector values of a motion vector. The motion vector detection section 103 sequentially matches the input data 101 with the reference image data 102 every divided region and detects the motion vector 104 within a search range of specified vector values. The histogram creation section 105 increments a motion vector detection frequency stored in the histogram recording section 109 corresponding to a range to which the vector value of the detected motion vector 104 belongs. When the increment process for one frame has been completed, a histogram for a motion vector detection frequency for one frame is formed in the histogram recording section 109 and is corrected if necessary. The shift amount setting section 107 decides the shift amount of a search range specified in the next frame by the search range setting section 108, according to the created (corrected) histogram.

15 Claims, 17 Drawing Sheets

MOTION VECTOR SEARCH POINT

MOTION VECTOR HISTOGRAM

● SHIFT AMOUNTS WHICH CAN BE SET

HISTOGRAM OF MOTION VECTOR
THRESHOLD-VALUE PROCESSED

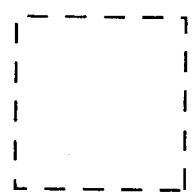
FIG.22
(a) NORMAL SEARCH RANGE
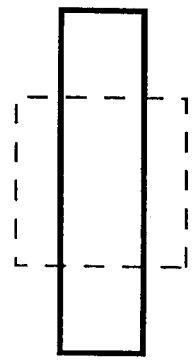
FIG.22
(c) SEARCH RANGE ATTACHING IMPORTANCE TO VERTICAL DIRECTION
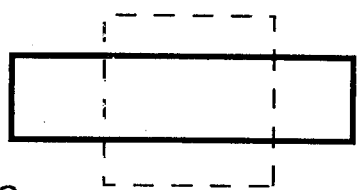
FIG.22
(b) SEARCH RANGE ATTACHING IMPORTANCE TO HORIZONTAL DIRECTION
FIG.23
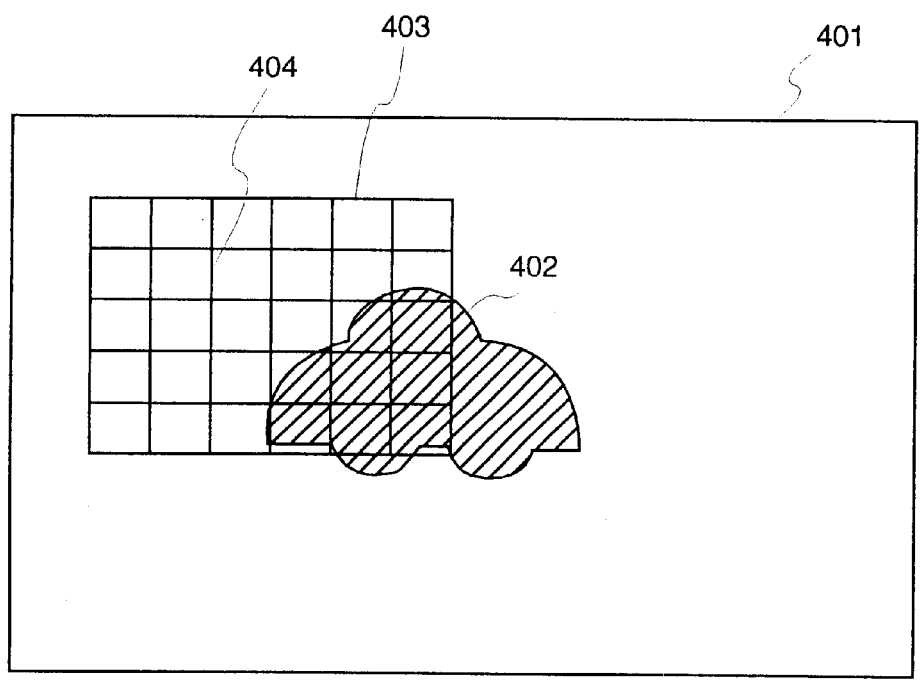

DEVICE AND METHOD OF DETECTING MOTION VECTORS

BACKGROUND OF THE INVENTION

The present invention relates to a device and method of detecting motion vectors. More particularly, the present invention relates to a technique of decreasing computational complexity for motion vector detection and realizing proper motion vector detection.

The motion compensated inter-frame prediction system using block matching operations has been standardized and widely used as a technique of efficiently encoding motion image data. The interframe prediction requires to detect motion vectors. In order to capture large motion vectors, the vector value of a motion vector must be widely searched. However, a wide search range of motion vectors leads to the enormous computation for the matching process, thus causing the disadvantage in enlarging the system scale and in making the real-time processing difficult.

In order to deal with such problems, JP-A No. 166684/1989 (hereinafter referred to as a prior art 1) discloses a motion vector detection device while JP-A No. 328333/1993 (hereinafter referred to as a prior art 2) discloses a motion vector detection device.

FIG. 19 is a block diagram illustrating the configuration of the motion vector detecting device according to the prior art 1. In the motion vector detection device, the frame memory 201 stores reference image data. The reference point setting section 202 sets reference points referred to according to the search motion vector by using the reference image data stored in the frame memory 201 based on an offset set by the horizontal offset control section 206 and an offset set by the vertical offset control section 207. The subtracting section 203 obtains a difference between input data and a reference point. The frame difference addition section 204 sums differential data sets being output results from the differential section 203. The minimum value detection section 205 detects a minimum value of the sum and then detects a motion vector to provide a horizontal motion vector component Vx and a vertical motion vector component Vy. The adding section 210 adds an offset value selected by the selector 208 to the motion vector horizontal component Vx from the minimum value detection section 205. The adding section 211 adds an offset value selected by the selector 209 to the motion vector horizontal component Vy from the minimum value detection section 205. Thus, the final motion vector (horizontal motion vector component and vertical motion vector component) is computed. The horizontal offset control section 206 sets an offset value for motion vector search in the next frame by the horizontal component Vx of a motion vector from the minimum value detection section 205. The vertical offset control section 207 sets an offset value for motion vector search in the next frame by the vertical component Vy of a motion vector from the minimum value detection section 205.

In the offset setting operation of the horizontal offset control section 206 and the vertical offset control section 207, one motion vector component is expressed by the following formula:

$$\delta V(n+1) = \delta V(n) + (\alpha \times \Delta V)$$

where $\delta V(n)$ is the offset value of the n-th frame; and $\Delta V$ is a search range. One component V of a motion vector is expressed by the range satisfying $-V \leq V \leq \Delta V$. The value of $\alpha$ is expressed the formula of $\alpha=1$ ($V=\Delta V$), $\alpha=-1$ ($V=\Delta V$), or $\alpha=0$ ($V \neq \Delta, -\Delta V$)).

FIG. 20 is a block diagram illustrating the configuration of the motion vector detecting device according to the prior art 2. In the motion vector detection device, the motion vector detection circuit 301 detects a motion vector providing a minimum prediction error based on image data for an input current frame and reference image data over a search range of specified by the selector 304. The motion vector memory 302 stores the detected motion vector for the duration of one frame and then outputs it as a motion vector at the same position on the previous frame to the search range decision section 303.

The search range decision section 303 judges the search range of motion vectors in a target block within the current frame according to the magnitude and direction of the motion vector of the previous frame. The selector 304 selectively outputs one of N search ranges ranging from the first search range to the n-th search range according to decision results of the search range decision section 303. The motion vector detection circuit 301 searches motion vectors over a selected search range.

In addition to the normal search range shown in FIG. 21($a$), the selector 304 outputs the search range attaching importance to the horizontal direction as shown in FIG. 21($b$), the search range attaching importance to the vertical direction as shown in FIG. 21($c$), or the search range attaching importance to the slanting direction as shown in FIG. 21($d$). The search range attaching importance to the horizontal direction as shown in FIG. 22($b$) and the search range attaching importance to the vertical direction as shown in FIG. 22($c$) can be used as a modified search range, in addition to the normal search range shown in FIG. 22($a$)

However, the prior arts 1 and 2 have the following drawbacks:

In the prior art 1, the search range cannot be followed under an occurrence condition of some motion vectors so that the optimum search range of motion vectors cannot be covered. As a consequence, the prior art 1 cannot suitably detect motion vectors.

The prior art 2 has a disadvantage in that the motion vector cannot be suitably detected because only limited types of search range can be selected. Moreover, since the search range over a motion boundary portion is often predicted erroneously, the motion vector cannot be suitably detected.

As a related art, JP-A-No. 30407/1993 (hereinafter referred to as prior art 3) discloses a motion vector detection technique for realizing the automatic mechanism such as autofocus, autoiris or the like for cameras.

In the prior art 3, a partial physical region in the image pickup region 401 acts as the motion vector detection region 403 for motion vector detection, as shown in FIG. 23.

The motion vector detection region 403 is divided into plural sub-divided regions 404 to create a histogram showing vector values of motion vectors detected for the sub-divided regions 404. The motion vector detection region 403 on the next frame is decided by setting the motion vector with the highest occurrence frequency on the histogram as the motion vector of the subject 402.

However, the process ranging from creation of a histogram to the computation of the motion vector detection region 403 on the next frame is realized by software. Hence, where the method is applied to encode motion images needed to detect motion vectors of the whole image region within one frame, a sophisticated processing circuit such as processor or microprocessor with considerable high processing capability is required.

When an image contains a still portion, the occurrence frequency of (0, 0)in a detected motion vector becomes high.

However, in the prior art 3, since a correction process is not performed to motion vectors with high occurrence frequency at (0, 0), the motion vector detection region 403 may not be suitably set according to the motion of the subject 402.

Moreover, since the same matching process must be performed for motion vector detection, regardless the degree of the motion of the subject 402, the computational complexity for the matching process becomes enormous to capture a specially large motion vector.

SUMMARY OF THE INVENTION

The present invention is made to solve the above-mentioned problems. The objective of the present invention is to provide a motion vector detection device that can reduce the computational complexity by limiting the range searching for the vector values of a motion vector for, particularly, motion image encoding applications and can suitably detect motion vectors by setting an optimum search range.

Another objective of the present invention is to provide a motion vector detection method that can reduce the computational complexity by limiting the range searching for the vector values of a motion vector for, particularly, motion image encoding applications and can suitably detect motion vectors by setting an optimum search range.

The objective of the present invention is achieved by a motion vector detection device comprising motion vector detection means for dividing image data on a current frame into predetermined regions, matching the image data on the current frame with reference image data every divided region, and detecting motion vectors with vector values within a search range externally indicated; motion vector frequency storage means for classifying the motion vectors within each divided region detected by the motion vector detection means under the vector value range and then storing the number of the motion vectors; and indication means for indicating a search range of vector values of a motion vector to be detected by the motion vector detection mean, based on the number of the motion vectors classified and stored by the motion vector frequency storage means.

In the motion vector detection device, the motion vector frequency storage means classifies the number of vector values of a motion vector detected by the motion vector detection means and stores the classified data in the form of, for example, a histogram. The motion vector detection device can be indicated a search range of vector values of a motion vector according to the histogram. That is, when the motion of a subject is uniform, the image data of a motion image has a localization in the vector value of a motion vector. Hence, the motion vector detection can be suitably performed by indicating a search range of vector values of a motion vector to be detected in the next frame according to the vector value of a motion vector detected in the image data for the previous frame. Moreover, since the vector value of a motion vector to be detected is limited, the computational complexity which is required in a matching process where the motion vector detection means detects the motion vector can be reduced. In the motion vector detection, the motion vector frequency storage means classifies motion vectors within each divided region detected by the motion vector detection means so as to contain the vector values of plural motion vectors within one range and then stores the number of the motion vectors.

In this case, one range in the histogram contains plural vector values. Hence, the motion vector frequency storage means is not required to have a storage capacity corresponding to the number of vector values of a motion vector contained within the search range, so that the storage capacity can be saved.

The motion vector detection device m ay further comprises storage control means for incrementing the number corresponding to a range containing the detected vector value among motion vector numbers stored in the motion vector frequency storage means every time the motion vector detection means detects the vector value of a motion vector in each of each divided region.

In the motion vector detection device, the indication means indicates the motion vector search range so as to center a vector value corresponding to the maximum number among the motion vector numbers classified and stored by the motion vector frequency storage means.

In this case, where there are plural classifications each of which contains the greatest number of motion vectors, the search range of vector values of the motion vector may be indicated so as to center the vector value corresponding to the barycentric position of them.

In the motion vector detection device, the indication means indicates a motion vector search range based on a number with numbers larger than a predetermined threshold value among the motion vector numbers classified and stored in the motion vector frequency storage means.

In this case, in the classification where vector values of a motion vector detected by the motion vector detection means exceed a predetermined threshold, it is not needed to store numbers exceeding the number of the corresponding vector values. Thus, the bit number to store the number of motion vectors detected every classification can be reduced so that the storage capacity of the motion vector frequency storage means can be reduced.

The motion vector detection device further comprises correction means for correcting a motion vector number stored in the motion vector frequency storage means. The indication means indicates a motion vector search range to be detected by the motion vector detection means, based on the motion vector number corrected by the correction means.

The correction means includes means for correcting the number corresponding to a classification containing a motion vector with the vector value of (0, 0), among motion vector numbers stored in the motion vector frequency storage means. Since moving images generally contain many still regions, the vector value of a motion vector detected from each divided region by the motion vector detection means is often expressed by (0, 0). If the number of motion vectors at (0, 0)is not corrected, the situation may occur where the center of the search range of vector values of the motion vector is always set to (0, 0). The above-mentioned correction means can prevent such a situation and can establish a suitable search range. Moreover, the correction means includes means for smoothing the motion vector numbers classified and stored in said motion vector frequency storage means within close vector value ranges by classification.

Thus, the correction means can remove a local effect on the detection results of a motion vector and can establish a suitable search range from the whole situation.

As described above, in the motion vector detection device having the correction means, the indication means indicates the motion vector search range so as to center the vector value corresponding to a classification having the largest motion vector among classifications containing the motion vector number corrected by the correction means.

The indication means indicates a motion vector value search range based on numbers with a larger value than a predetermined threshold value among the motion vector numbers corrected by the correction means.

In the motion vector detection device, the time interval between the reference frame and the current frame may differ for each frame. In this case, the indication means indicates a motion vector value search range according to a time interval between the reference image data and image data for the current frame.

Thus, even if the time interval between the reference image data and the image data for a current frame is different from each frame, the search range of vector values of a motion vector can be always set to a suitable range.

When the time interval between a reference frame and image data in a current frame is different every frame, the reference image data may come before and after image data for the current frame in input order. In this case, the motion vector frequency storage means includes means for adjusting vector values of motion vectors detected by the motion vector detection means to provide a different sign when the reference image data comes before or after image data for the current frame.

In the motion vector detection device, the motion vector detection means can detect plural motion vectors from each of divided regions. In this case, the motion vector frequency storage means assigns weights to motion vector numbers detected from each divided region by the motion vector detection means and then stores the weighted motion vector numbers.

In order to accomplish the above-mentioned object, the motion vector detecting method comprises a vector motion detection step of dividing image data for a current frame into predetermined regions, matching the image data of the current frame with reference image data every divided region; and detecting a motion vector with a vector value within a search range externally indicated; a motion vector distribution creation step of creating a distribution where motion vectors detected from each divided region in the motion vector detection step are classified every range of predetermined vector values; and an indication step of indicating a motion vector value search range to be detected in the motion vector detection, based on the distribution created in the distribution creation step.

BRIEF DESCRIPTION OF THE DRAWINGS

This and other objects, features and advantages of the present invention will become more apparent upon a reading of the following detailed description and drawings, in which:

FIGS. 22a, 22b, and 22c are diagrams explaining a motion vector search range of a motion vector detection device according to the related art 2; and FIG. 23 is a diagram explaining the motion vector detection of the related art 3.

DESCRIPTION OF THE EMBODIMENTS

Next, embodiments of the present invention will be described below in detail with reference to the attached drawings.

Figure 1:
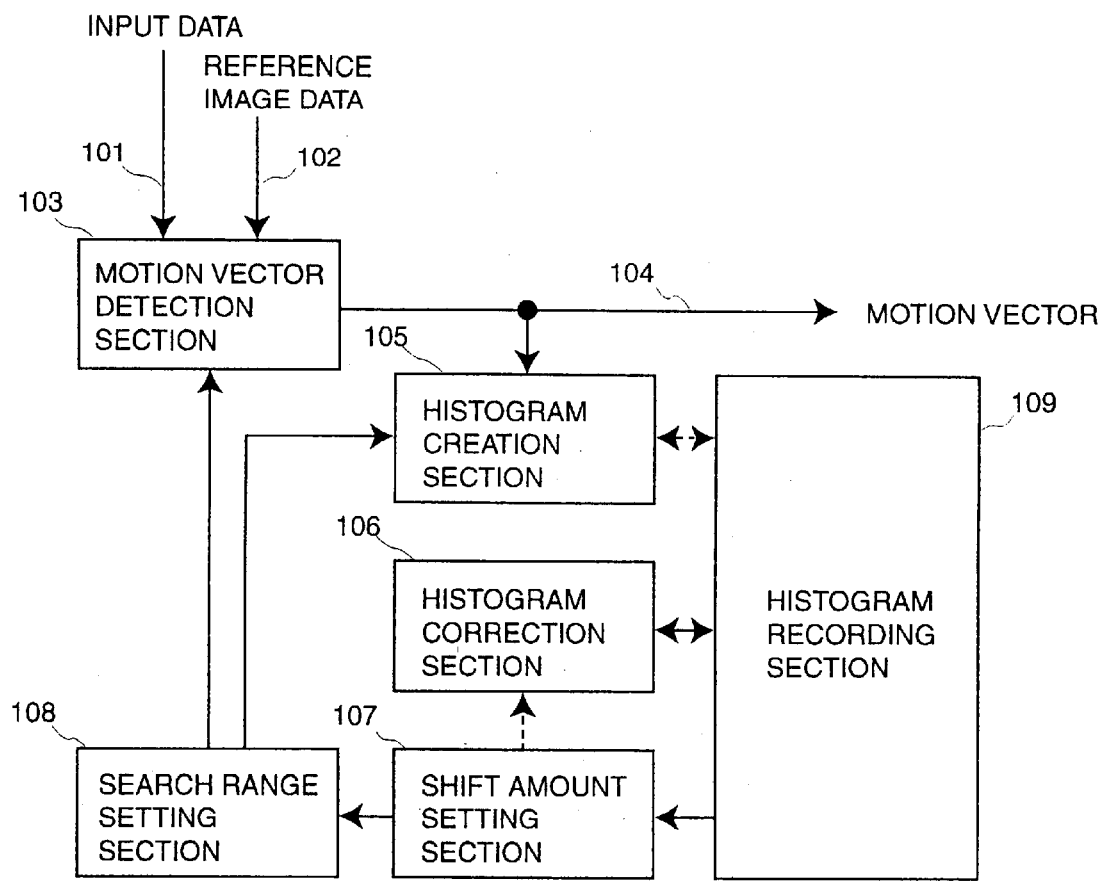
FIG. 1 is a schematic block diagram illustrating the configuration of a motion vector detection device according to an embodiment of the present invention.

First, a motion vector detection device according to an embodiment of the present invention will be roughly described by referring to the block diagram of FIG. 1.

The motion vector detection device divides input data (image data) 101 into regions each covering predetermined areas and searches for a motion vector every divided region. The motion vector detection device consists of a motion vector detection section 103, a histogram creation section 105, a histogram correction section 106, a shift-amount setting section 107, a search range setting section 108, and a histogram storage section 109.

The motion vector detection section 103 divides the input data 101 and the reference image data 102 for one frame into regions of a predetermined size and detects the motion vector 104 by the matching process between the input data 101 and the reference image data 102 for the every divided region. The search range setting section 108 specifies the search range of vector values of a motion vector detected by the motion vector detection section 103 according to the results processed in the previous frame.

The histogram recording section 109 divides the search range of vector values of a vector value into regions each covering predetermined values and stores a histogram representing a motion vector detection frequency over each vector value range.

The histogram creation section 105 increments a motion vector detection frequency to be recorded in the histogram recording section 109 over the range corresponding to the vector value of a motion vector 104 detected by the motion vector detection section 103 in order to create a histogram representing motion vector detection frequencies. The motion vector detection frequency incremented by the histogram creation section 105 is controlled according to the search range set by the search range setting section 108. The histogram correction section 106, if necessary, compensates the motion vector detection frequency stored in the histogram storage section 109.

After the correction of a histogram by the histogram correction section 106 or after a judgment on no need of correction, the shift-amount setting section 107 decides the shift amount of a motion vector search range according to the motion vector detection frequency histogram stored in the histogram storage section 109. The search range setting section 108 specifies a motion vector search range of the motion vector detection section 103 according to the shift amount decided by the shift amount setting section 107.

The motion vector detection section 103, the histogram creation section 106, the shift amount setting section 107 and the search range setting section 108 are respectively configured of a dedicated hardware. The function of each element may be configured of a software and a processor executing the same. The histogram storage section 109 can be formed by securing regions in a memory.

The operation of the motion vector detection device according to the embodiment will be roughly described below with reference to FIG. 1.

In an initial operation, all motion vector detection frequencies in the previous frame process stored in the histogram storage section 109 are cleared to "0" before starting a process for one frame. When a frame is the first frame subjected to interframe prediction, the shift amount setting section 107 sets the shift amount to (0, 0).

When the processing for one frame is started, the motion vector detection section 103 detects the motion vector 104 by subjecting the input data 101 and the reference image data to a matching process every divided region. The detected motion vector 104 is output to the histogram creation section 105 and is externally sent out for an encoding process.

In response to the motion vector 104, the histogram creation section 105 increments the motion vector detection frequency stored in the histogram recording section 109 within a range corresponding to the vector value of the motion vector 104. The increment process is performed to all divided regions within one frame by means of the motion vector detection section 103 and the histogram creation section 105.

When the process for one frame is finished, the detection frequency is determined for the vector value range of the motion vector 104 detected in each divided region, so that a histogram is created. The created histogram is corrected, if necessary, by the histogram correction section 106.

After either the histogram correction by the histogram correction section 106 or a judgment on no need for correction, the shift amount setting section 107 decides a search range shift amount which specifies a range for searching for vector values of a motion vector to be detected in the next frame, according to the motion vector detection frequency histogram stored in the histogram storage section 109. The search range setting section 108 sets a search range to be processed in the next frame, based on the decided shift amount.

In the next frame processing step, the motion vector detection section 103 specifies the search range set by the search range setting section 108 as a motion vector search range of a motion vector to be detected.

Next, the motion vector detection device according to the present embodiment will be described in more detail by referring to the block diagram of FIG. 2.

Figure 2:
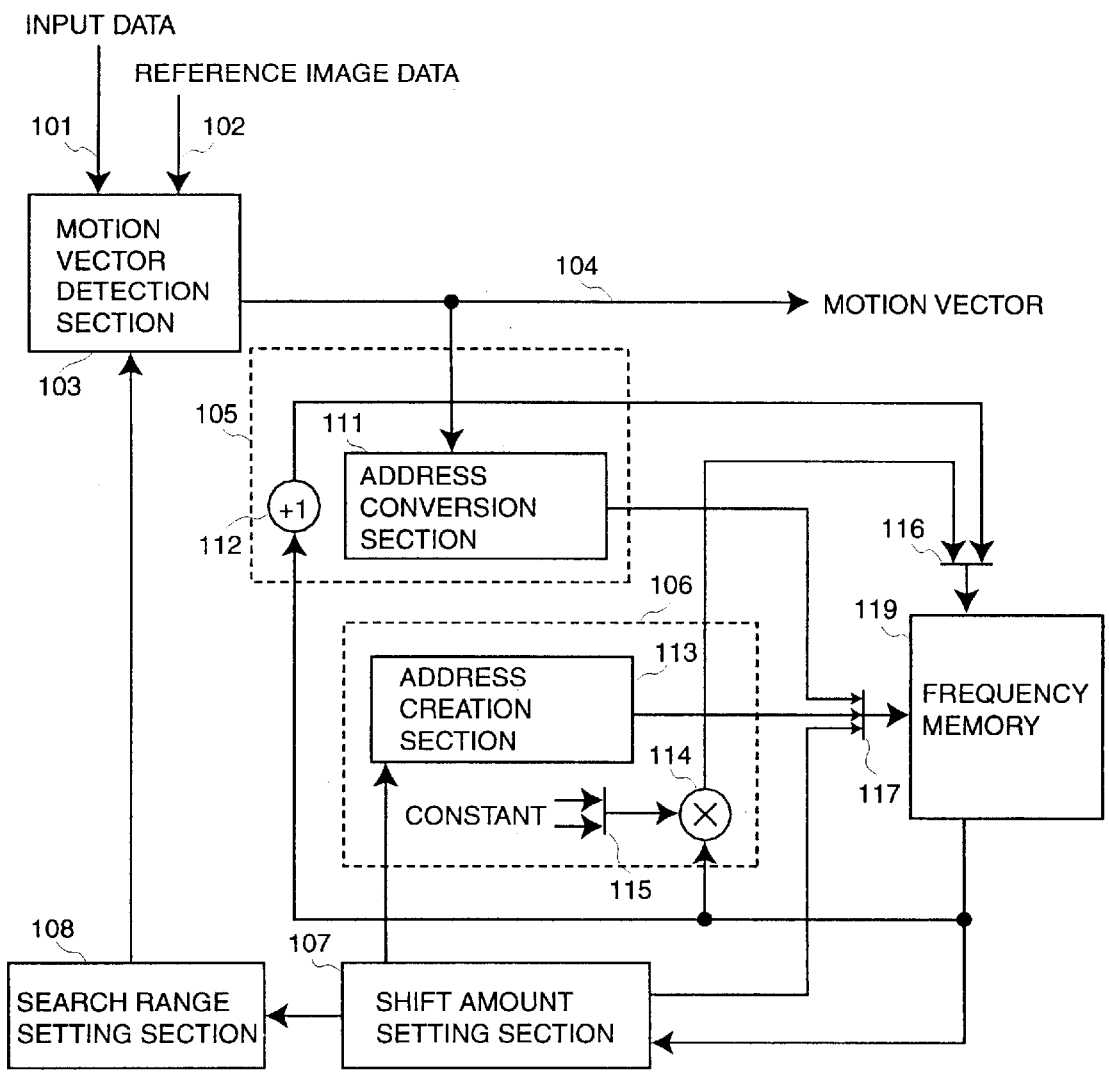
FIG. 2 is a block diagram illustrating a detail configuration of a motion vector detection device according to an embodiment of the present invention.

FIG. 2 shows the detail configuration of the motion vector detection device shown in FIG. 1. The histogram creation 105 and the histogram correction section 106 are shown in more concrete. A frequency memory 119 corresponds to the histogram storage section 109 of FIG. 1.

The histogram creation section 105 consists of an address conversion section 111 and an incrementer 112. The address conversion section 111 outputs an address in the frequency memory 119 which stores a motion vector detection frequency which corresponds to a range of the vector values of the detected motion vector 114. The incrementer 112 increments by "1" a motion vector detection frequency read out of the frequency memory 116 according to the output from the address conversion section 111. The motion vector detection frequency incremented by the incrementer 112 is re-written to its corresponding address in the frequency memory 119.

The histogram correction section 106 is formed of an address creation section 113 and a multiplier 114. The address creation section 113 outputs an address in the frequency memory 119 according to the output from the shift amount setting section 107 while the frequency memory 119 stores a vector detection frequency corresponding to a range to be corrected. For the purpose of correction, the multiplier 114 multiplies the motion vector detection frequency read out of the frequency memory 119 according to the output from the address creation section 113 by a predetermined constant output via the selector 115. A motion vector detection frequency multiplied and corrected by means of the multiplier 114 is re-written to the corresponding address in the frequency memory 119.

The frequency memory 119 consists of memory regions whose word number is corresponding to the number of respective ranges in a histogram which records motion vector detection frequencies. In this embodiment, the histogram has ranges provided in one pixel unit. The number of ranges in a histogram is 64 (=8×8), as described later. Hence, the word number of the frequency memory 119 is 64.

The shift amount setting section 107 is formed of, for example, combinational logical circuits. When a histogram is created within the frequency memory 119, the shift amount setting section 107 reads it out of the frequency memory 119 to judge whether or not some correction is needed. When correction is required, the shift amount setting section 107 outputs a control signal for creating an address to be corrected and a control signal for selecting a predetermined constant by the selector 115 to the address creation section 113. The shift amount setting section 107 decides a search range shift amount for designating a vector value search range of a motion vector to be detected in the next frame, according to a corrected histogram or according to the original histogram when the judgment indicates no need for correction.

The search range setting section 108 sets a vector value search range of a motion vector according to the shift amount determined by the shift amount setting section 107.

Figure 3:
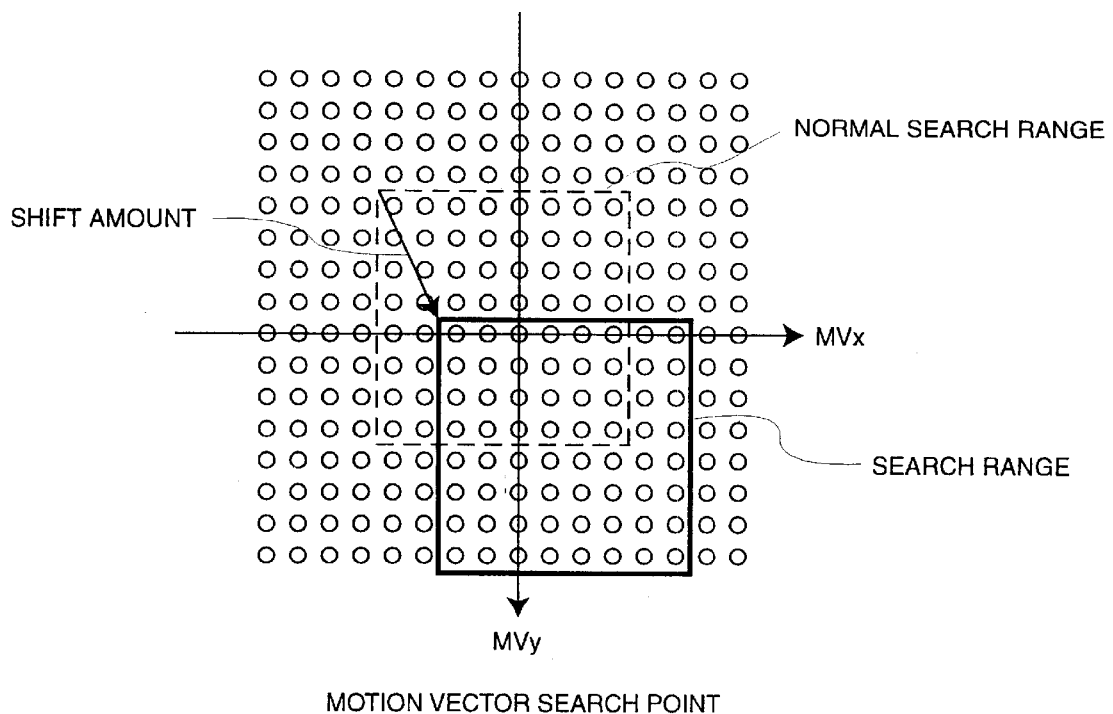
FIG. 3 is a diagram explaining a shift of a motion vector search range.

The setting of a vector value search range of a motion vector by the search range setting section 108 will be described with reference to FIG. 3. Referring to FIG. 3, round symbols represent the search points of motion vectors.

As shown in FIG. 3, the normal search range satisfies the inequalities $-4 \leq MVx \leq +3$ and $-4 \leq MVy \leq +3$. When the shift amount setting section 108 indicates (2, 4) as the shift amount from, the search range satisfies the inequalities $-2 \leq MVx \leq +5$ and $0 \leq MVy \leq +7$.

Next, the operation of the motion vector detection device shown in FIG. 2 will be described below.

Here, the case where motion images are processed in the forward direction and the time interval between the input data 101 and the reference image data 102 does not vary every frame will be described as an example.

When a frame is the first frame subjected to interframe prediction, the shift amount setting section 107 sets the shift amount of a search frequency of a vector value of a motion vector to (0, 0). Hence, the search range specified by the motion vector detection section 104 is expressed by the inequalities $-4 \leq MVx \leq +3$ and $-4 \leq MVy \leq +3$. In other cases, the shift amount of the search frequency of a vector value of a motion vector is set based on the histogram created in the frame processing step in which the interframe prediction has been performed just before the current operation. In an initial process before starting a process for one frame, all storage contents within the frequency memory 119 are cleared to "0".

When the process for one frame is started, the motion vector detection section 103 detects the motion vector 104 by matching the input data 101 and reference image data 102 and the reference image data 103 to the reference image data for each divided region. The matching process for detecting the motion vector 104 is performed according to a motion vector value search range decided based on the shift amount set by the shift amount setting section 107. That is, only the matching process of detecting motion vectors with vector values within a search range is performed but the matching process of detecting motion vectors with vector values out of a search range is not performed.

The motion vector detection section 103 sequentially outputs the motion vectors 104 detected in the matching process every divided region. Regarding the regions where motion vectors with the vector values within a search range are not detected, the motion vector detection section 103 does not output any motion vector but processes the next divided region. The motion vector detection section 103 outputs the motion vector 104 to circuits outside the device of FIG. 2 to perform an encoding process and outputs it to the address conversion section 111 in the histogram creation section 105.

In response to the motion vector 104, the address conversion section 111 outputs an address of the frequency memory 119 for storing the motion vector frequency corresponding to the vector value of the motion vector 104. Thus, the frequency memory 119 outputs the motion vector frequency corresponding to the vector value of the motion vector 104 while the incrementer 112 increments the output by "1". Then the result is re-written to the same address.

When the above process is completely applied to data of each divided region for one frame, the motion vector detection frequency histogram is determined.

The address creation section 113 in the histogram correction section 106 outputs an address from which the detection frequency of a motion vector with the vector value (0, 0) stored in the frequency memory 119 is output, according to the shift amount output in the previous process from the shift amount decision section 107. Thus, the frequency memory 119 outputs the detection frequency of a motion vector with a vector value (0, 0). The multiplier 114 multiplies the detection frequency by a predetermined constant output from the selector 115. The multiplication result of the multiplier 114 is re-written to the same address of the frequency memory 119.

Figure 4:
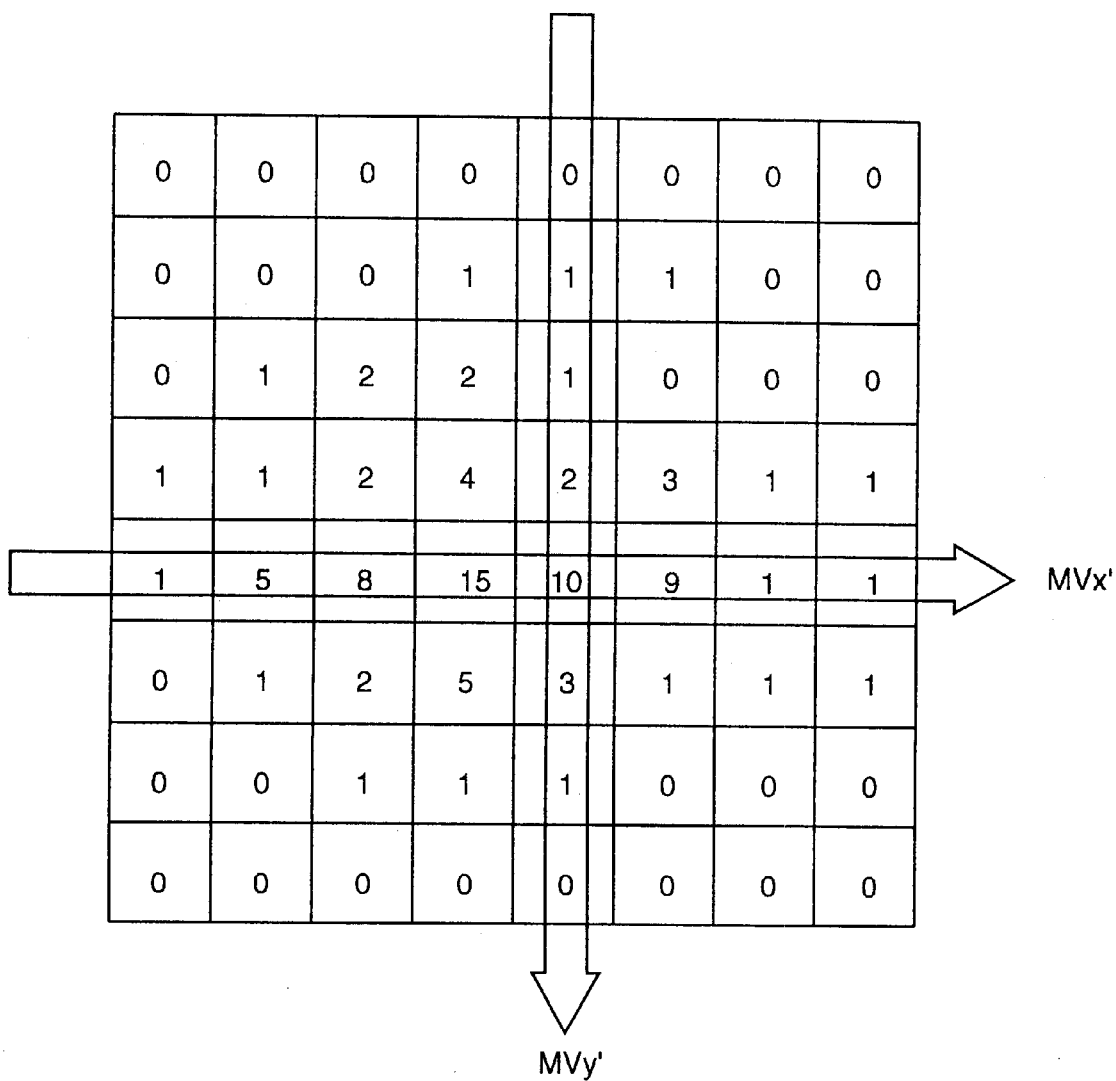
FIG. 4 is a diagram explaining an example of a histogram for the detection frequency of a corrected motion vector.

For example, referring to the histogram shown in FIG. 4, it is now assumed that the detection frequency of a motion vector with the vector value (0, 0) is 20. The multiplier 114 multiplies the detection frequency "20" by "0.5". Thus, the detection frequency of a motion vector with the vector value (0, 0) is corrected to "10" smaller than "20".

In the above-mentioned step, when the motion vector detection frequency histogram stored in the frequency memory 119 is corrected, the shift amount decision section 108 decides the search range shift amount in such a way that a vector value to be increased in the corrected histogram comes to the center of a search range in the next frame process. Based on the decided shift amount, the search range setting section 108 specifies the search range in the next frame process to the motion vector detection section 104.

For example, as shown in FIG. 4, the highest detection frequency of a motion vector with a vector value (−1, 0) is "15". Hence, the shift amount setting section 108 sets the shift amount of a search range in the next frame process to (−1, 0). Thus, the search range of the vector quantity of a motion vector in the next frame process is set to the range expressed by the $-5 \leq MVx \leq +2$ and $-4 \leq MVy \leq +3$.

In the next frame process, the motion vector detection section 104 searches for the motion vector which has vector values within a search range set by the search range setting section 108.

As described above, in the motion vector detection device in the above-mentioned embodiment, the frequency memory 119 stores the detection frequency of the motion vector 104 from the motion vector detection section 103 in the form of a histogram classified every vector value. Then, the shift amount setting section 107 sets the vector value with the highest detection frequency as a shift amount. In the next frame, the shift amount comes to the center of the search range set by the search range setting section 108.

That is, the search range of a motion vector to be detected in the next frame can be suitably set by using the localization of the vector value of a certain motion vector contained in the image data of a moving image. For that reason, the motion vector detection device according to the present embodiment can suitably detect motion vectors. Moreover, since the motion vector to be detected by the motion vector detection section 104 is limited within a search range in which the vector value thereof is specified by the search range setting section 108, the motion vector setting section 104 can limit the repetitive cycle of the matching process which detects motion vectors. Thus, the computational complexity required for motion vector detection can be reduced.

Moreover, the histogram correction section 106 sets the vector value so as to decrease the detection frequency of a motion vector with the vector value of (0, 0). This operation can prevent a motion vector value search range from being always set to the center (0, 0) although the vector value at (0, 0) tends to be most detected as the center at still image regions in a motion image.

It should be noted that the present invention is not limited only to the above-mentioned embodiment. Various modifications can be applicable to the circuit configuration and creation and correction of a histogram. Modifications of the present invention will be described below.

It should be noted that the vector value search range of a motion vector is not limited to the square form shown in the above-mentioned embodiment but may be represented as a rectangular form, plural rectangular forms, or a given form designated by a bit map. Even if the search region of vector values of a motion vector has a given form, the histogram storage section 109 (or the frequency memory 119) can usefully work that has a sufficient capacity of storing the detection frequencies of a motion vector.

Figure 5:
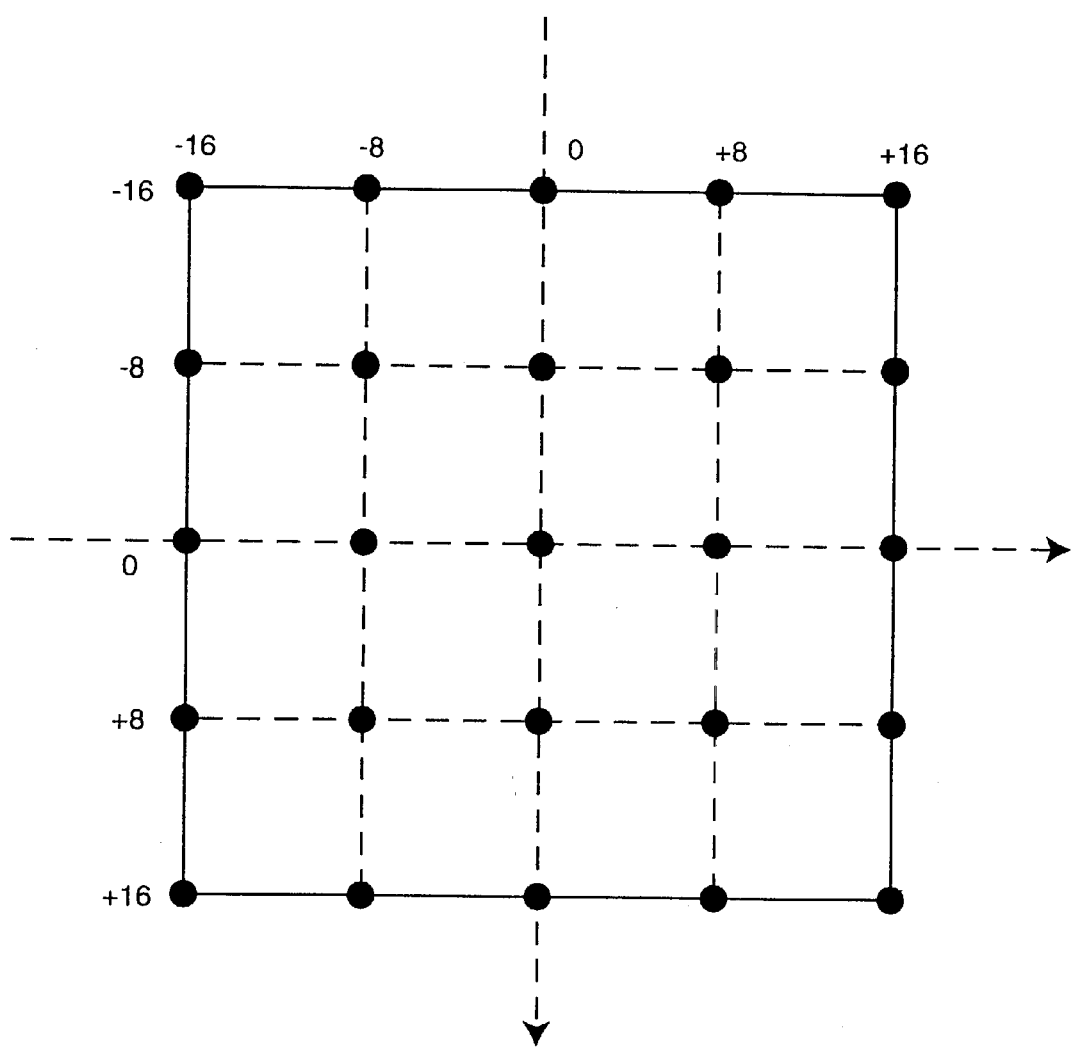
FIG. 5 is a diagram explaining positions of a shift amount to be set.

FIG. 5 is a diagram explaining the positions (or locations) of adjustable shift amounts. This example shows that a shift amount can be set at the black point. That is, it is shown that the shift amount can be vertically and horizontally set over the range of −16 to +16 in 8 pixel units.

Figure 6:
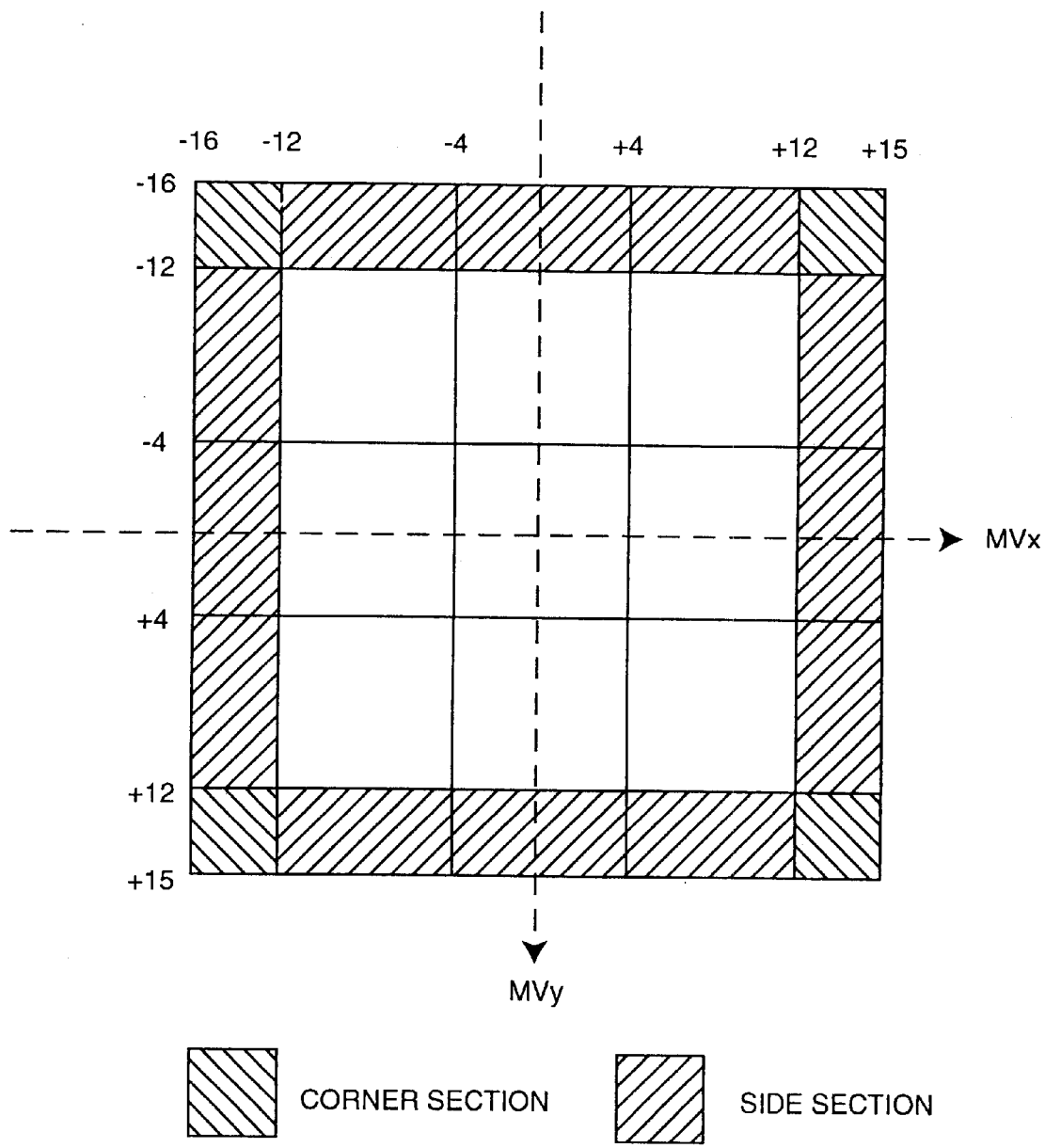
FIG. 6 is a diagram explaining a method of configuring a histogram for a motion vector detection frequency.

FIG. 6 is a diagram explaining the method of configuring a motion vector detection frequency histogram.

In this example, the normal search range of vector quantities of a motion vector is set to $-16 \leq MVx \leq +15$ and $-16 \leq MVy \leq +15$. The vertical and horizontal components of a motion vector are divided into five steps including −16 to −13, −12 to −5, −4 to +3, +4 to +11, +12 to +15 in such a way that the adjustable positions of the shift amount shown in FIG. 5 are centered. This can be accomplished by securing a region for 25 words (=5×5) within the histogram storage section 109 (or the frequency memory 119). Thus, the memory capacity can be reduced, compared with the creation of respective histograms for motion vectors in one pixel unit.

With the thus-divided search range, the number of motion vectors to be searched becomes small in the corner segments and on side segments shown in FIG. 6. In this case, the address creation section 113 in the histogram correction section 106 first outputs the address of each corner segment and then outputs the detection frequency of a motion vector. The selector 115 outputs the constant "4". The multiplier 114 multiplies the detection frequency of a motion vector by the constant "4" and then rewrites the result to the corresponding address of the frequency memory 119. Moreover, the address creation section 113 outputs the address of each side segment as well as the detection frequency of a motion vector. On the other hand, the selector 115 outputs the constant "2". The multiplier 114 multiplies the detection frequency of a motion vector by "2" and then rewrites the result to the corresponding address of the frequency memory 119. In this procedure, a difference between detection frequencies of a motion vector due to different magnitudes in respective sections can be corrected.

In creation of the histogram, plural motion vectors with the same prediction direction may be sometimes detected in respective divided regions. For example, such a situation corresponds to the field prediction or dual prime prediction in a frame structure (to be described later) in MPEG-2 (Moving Picture Experts Group). In that case, a histogram may be created by counting all detected motion vectors.

In that case, all detected motion vectors may be equally handled or may be weighted according to the number of motion vectors detected every divided region. When two motion vectors, for example, are detected in one divided region, the detection frequency corresponding to each motion vector in the frequency storage section 109 (or the frequency memory 119) is incremented "1" by "1". When one motion vector is detected in one divided region, the detection frequency corresponding to each motion vector in the frequency storage section 109 (or the frequency memory 119) is incremented by "2".

Furthermore, when plural motion vectors are detected in one divided region, the system that uses only the first vector or only vectors in the same parity can be employed. This system can simplify the process and can sufficiently grasp the tendency of the motion of an image.

Moreover, regions where motion vectors cannot be detected may occur. For example, this occurs when an intraframe encoding mode is selected in MPEG-2, which performs an intra-encoding but is not performed an interframe prediction. In this case, the motion vector detection frequencies stored in the histogram storage section 109 (or the frequency memory 119) are not updated. Otherwise, the motion vector detected as a non-intra mode before the mode judgment may be measured as the detection frequency.

Figure 7:
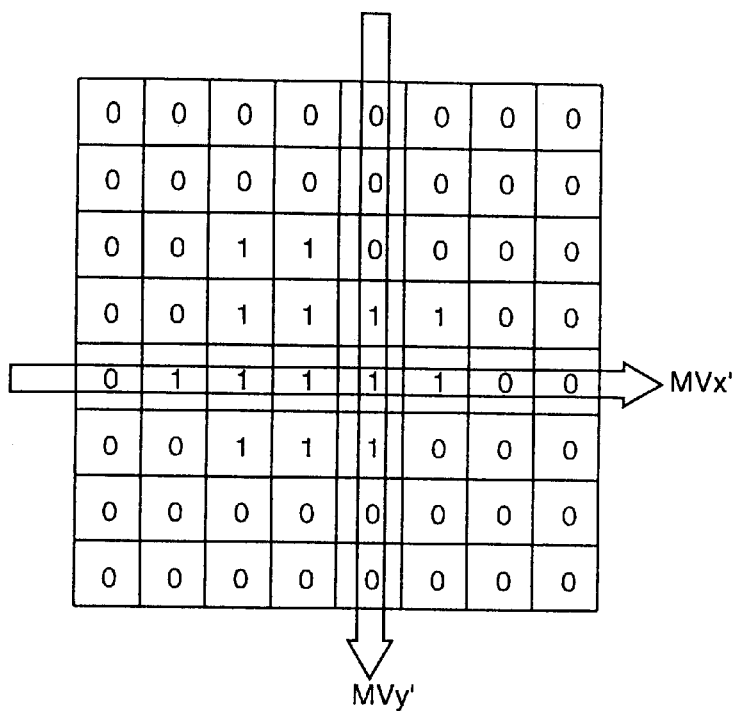
FIG. 7 is a diagram explaining another example of a histogram for a motion vector detection frequency.

FIG. 7 is a diagram explaining another method for setting the shift amount of a search range by the shift amount setting section 107.

In this embodiment, the shift amount correction section 106 subjects a histogram to a threshold process. In FIG. 7, the motion vector detection frequencies of 2 and more in the histogram shown in FIG. 6 are expressed as "1" in binary notation. The motion vector detection frequencies of less than 2 in the histogram shown in FIG. 6 are expressed as "0" in binary notation.

In this case, the shift amount setting section 107 sets the average value (−0.928, −0.275) of motion vectors representing "1" in the binary-coded histogram as a search range shift amount. The shift amount setting section 107 sets the average value (−1, −0.5) as a shift amount, −1 being the average value between the maximum value and the minimum value of horizontal components of a motion vector representing "1" in the binary-coded histogram and −0.5 being the average value between the maximum value and the minimum value of vertical components of a motion vector representing "1" in the binary-coded histogram.

The histogram creation section 104 may be designed in such a way that when the memory content of the histogram storage section 109 (or the frequency memory 119) exceeds a threshold, the detection frequency is not incremented even if the motion vector of the corresponding vector value is detected. Thus, the bit number for storing the motion vector detection frequency in each range can be reduced. As a result, the memory capacity of the histogram storage section (or the frequency memory 119) can be reduced.

Figure 8:
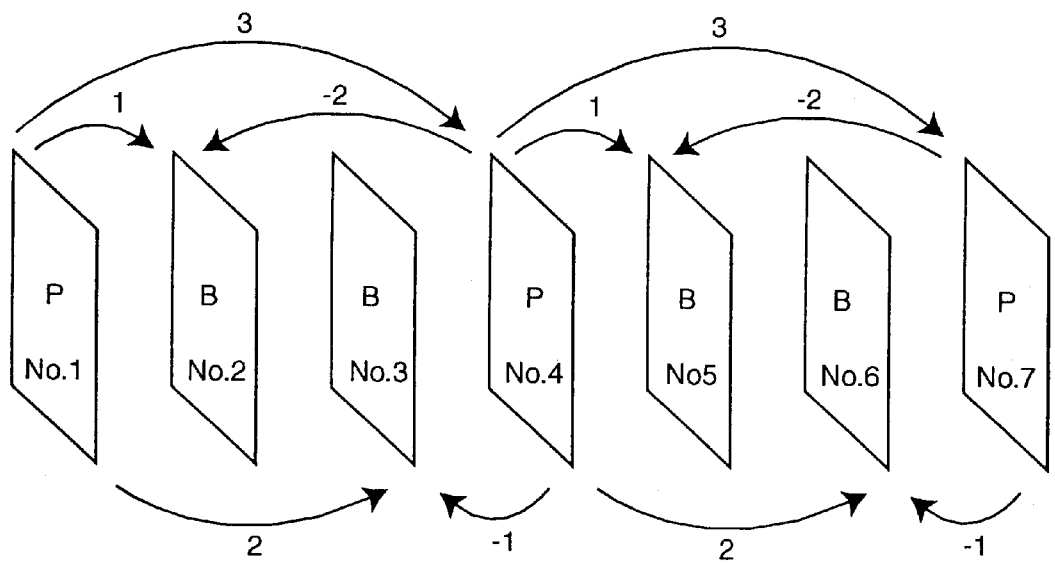
FIG. 8 is a diagram explaining a method of adjusting shift amounts according to time intervals when the time interval between input data and reference image data varies every frame.

FIG. 8 is a diagram explaining the method of adjusting shift amounts according to time intervals when the time interval between input data and reference image data varies every frame.

In this example, the image is encoded as a P picture every three frames while the shift amount is encoded as a B picture every two frames. It is now assumed that after the image corresponding to the frame No. 1 is completely encoded, images are encoded in the order of the frame No. 4, frame No. 2, frame No. 3, frame No. 7, . . . , sequentially. That is, when images of the frame No. 4, frame No. 2, frame No. 3, frame No. 7, are the input data 101, the images corresponding to the frame No. 1, the frames No. 1 and No. 4, and the frames No. 1 and No. 4, and the frame No. 4, . . . become the reference image data 102.

In this case, with the frame No. 1 set as a reference image, the search range of vector values of a motion vector related to the image in the frame No. 4 is determined. In the process of the image in the frame No. 4, the motion vector of which the time interval corresponds to three frames in the forward direction is searched. The shift amount setting section 107 triplicates the shift amount, compared with the case where the time interval corresponds to one frame in the forward direction as shown the above embodiment.

Next, with the images in the frames No. 1 and No. 4 set as a reference image, the search range of vector values of a motion vector on the image in the frame No. 2 is determined. In the processing of the image in the frame No. 2, the motion vector in which the time interval corresponds to one frame in the forward direction is searched for the reference of the image from the frame No. 1. For the reference of the image from the frame No. 4, the motion vector in which the time interval corresponds to two frames in the backward direction is searched. In this case, the shift amount setting section 107 negatively doubles the shift amount, compared with the case where the time interval corresponds to one frame in the forward direction.

Next, with the images in the frames No. 1 and No. 4 set as reference images, the search range of vector values of a motion vector related to the image in the frame No. 3 is determined. In the processing of the image ih the frame No. 3, the motion vector in which the time interval corresponds to two frames in the forward direction is searched for the reference of the image from the frame No. 1. In this case, the shift amount setting section 107 doubles the shift amount. The motion vector in which the time interval corresponds to two frames in the backward direction is searched for the reference of the image from the frame No. 4. In this case, the shift amount setting section 107 sets the shift amount negatively, compared with the case where the time interval corresponds to one frame in the forward direction.

Similarly, in the processing of the image in the frame No. 7, the shift amount setting section 107 triplicates the shift amount, compared with the case where the time interval corresponds to one frame in the forward direction. In the processing of the image in the frame No. 5, the shift amount setting section 107 sets the shift amount twice for the reference from the frame No. 4, compared with the case where the time interval corresponds to one frame in the forward direction. In the processing of the image for the reference from the frame No. 7, the shift amount is negatively doubled. In the processing of the image in the frame No. 6, the shift amount setting section 107 doubles the shift amount for the reference from the frame No. 4, compared with the case where the time interval corresponds to one frame in the forward direction. The shift amount is negatively set for the reference from the frame No. 7.

As described above, when the time interval between the input data 101 and the reference image data 102 varies every frame, the shift amount setting section 107 adjusts the shift amount to be set according to the time interval, so that the search range setting section 108 can set the search range of vector values of a motion vector to a suitable value.

When the interlace signal is handled in a similar manner to the MPEG-2, prediction (hereinafter referred to as field prediction) can be performed in field units.

Figure 9:
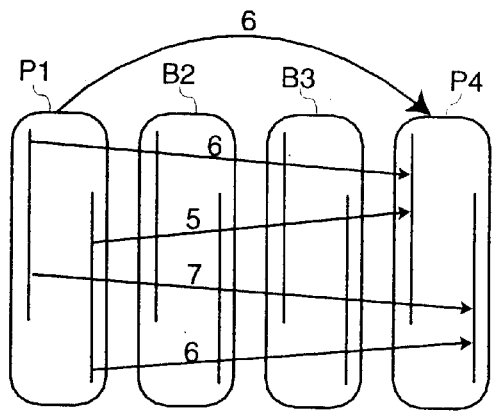
FIG. 9 is a diagram explaining time intervals between image data sets in the case of field prediction.

Let us now consider that the case where when the time interval of P pictures corresponds to, for example, 3 frames, as shown in FIG. 9, the motion picture of the P picture (P4) in the fourth frame is detected.

The first field of the picture P4 is encoded by referring to the two fields of the P picture in the first frame. When the field prediction is selected, the time interval to the field referred to by the first field of the picture P4 corresponds to 5 fields or 6 fields. The time interval to the field referred to by the second field of the picture P4 corresponds to 6 fields or 7 fields. When the frame prediction is selected, the time interval to the field referred to by two fields of the picture P4 corresponds to 6 fields.

Figure 10:
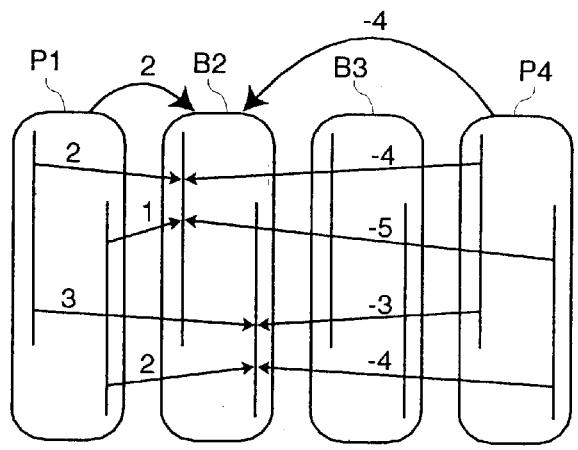
FIG. 10 is a diagram explaining time intervals between image data sets for field prediction.
Figure 11:
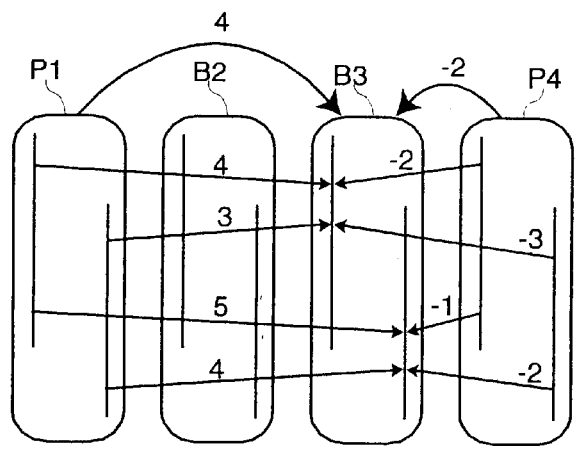
FIG. 11 is a diagram explaining time intervals between image data sets for field prediction.

This situation is applicable to the B picture. Fields referred to by the two fields of the B picture (B2) in the second frame are shown in FIG. 10. Fields referred to by the two fields of the B picture (B3) in the third frame are shown in FIG. 11. The time interval to the field referred to by the two fields of the picture B2 corresponds to one field or two fields.

Figure 12:
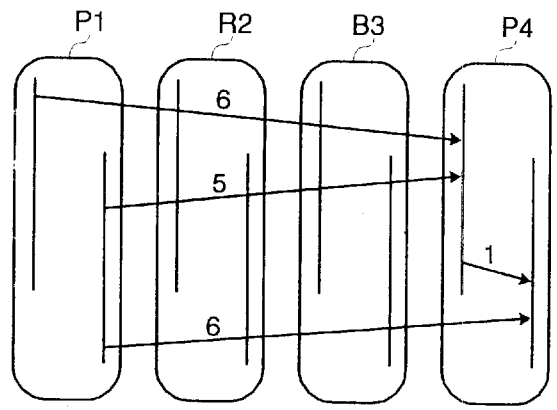
FIG. 12 is a diagram explaining time intervals between image data sets for field prediction.

When the encoding is performed by a field structure, fields referred to by the two fields of the P picture (P4) in the fourth frame are shown in FIG. 12. That is, the time interval to the field referred to by the first field of the picture P4 corresponds to five fields or six fields. The time interval to the field referred to by the second field of the picture P4 corresponds to one field or six fields.

Moreover, the dual prediction that performs an average prediction between a field in same parity and a field in opposite parity is performed in MPEG-2.

Figure 13:
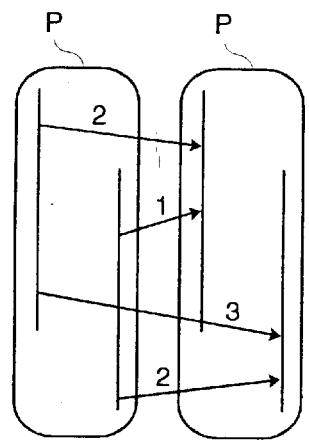
FIG. 13 is a diagram explaining time intervals between image data sets for dual prime prediction.

For example, when prediction is performed using a frame structure, fields referred to by the two fields of the P picture (P2) in the second frame are shown in FIG. 13. That is, the time interval to the field referred to by the first field of the picture P2 corresponds to one field or two fields. The time interval to the field referred to by the second field of the picture P2 corresponds to two fields or three fields.

Figure 14:
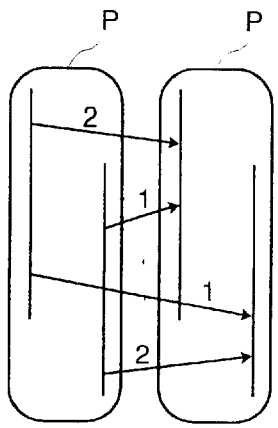
FIG. 14 is a diagram explaining time intervals between image data sets for dual prime prediction.

When prediction is performed using a field structure, fields referred to by the two fields of the P picture (P2) in the second frame are shown in FIG. 14. That is, the time interval to the field referred to by the first field of the picture P2 corresponds to one field or two fields. The time interval to the field referred to by the second field of the picture P2 corresponds to one field or two fields.

As described above, even in the field prediction to, for example, the MPEG-2, the shift amount setting section 107 adjusts the shift amount to be set according to the time interval, so that the search range setting section 108 can set the search range of vector values of a motion vector to a suitable value.

The encoding operation in which the P picture appears every three frames has been described above. This encoding operation can be applied to P pictures or B pictures with different structures. Moreover, the encoding operation can be applied to even the case where the time interval between the input data 101 and the reference image data 102 varies through frame skipping.

The search range shift amount of a motion vector value obtained from a histogram stored in the histogram storage section 109 (or the frequency memory 119) is corrected to an actually adjustable value. Then the corrected shift value is set by the shift amount setting section 107. For example, when the horizontal and vertical components of a shift amount exceed an actually adjustable search range, the shift amount setting section 107 sets the shift amount to a adjustable maximum or minimum value. When the shift amount has a fraction (or the remainder which cannot be completely divided by an adjustable pixel unit), the shift amount setting section 107 rounds to an adjustable pixel unit.

Figure 15:
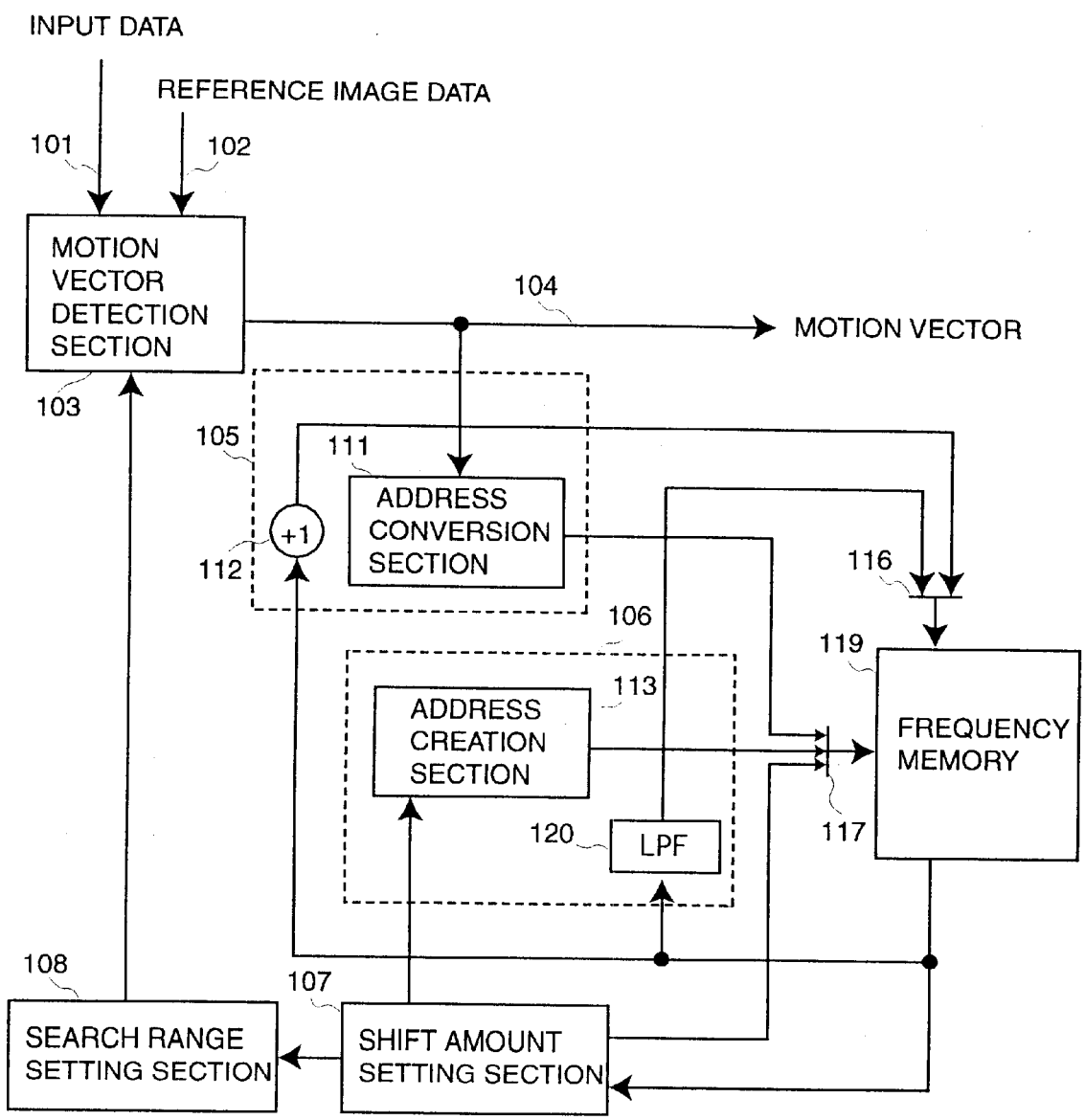
FIG. 15 is a block diagram illustrating the configuration of a motion vector detection device according to a modified embodiment of the present invention.

FIG. 15 shows the configuration of the motion vector detection device according to the modification of the present invention. The motion vector detection device differs from that shown in FIG. 2 in the configuration of the histogram correction section 106. The histogram correction section 106 consists of an address creation section 113 and a low-pass filter (LPF) 120.

In this case, the low pass filter, for example, can smooth the motion vector detection frequency stored in the frequency memory 119 to the detection frequency within the 3×3 space expanded up, down, right and left.

In the smoothing process, a local influence on the motion vector detection results can be removed. The motion vector value search range can be suitably set in the general tendency.

Figure 16:
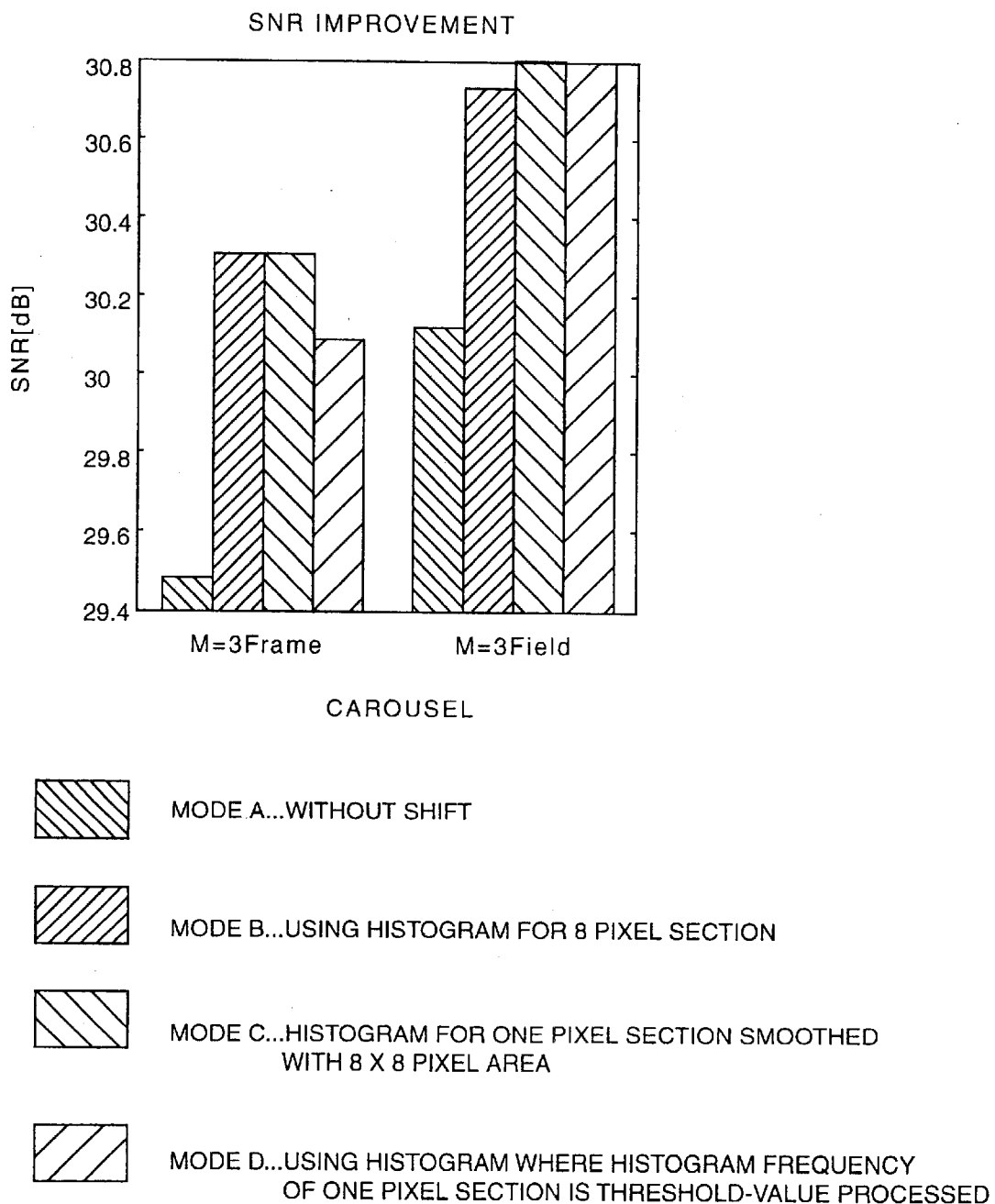
FIG. 16 is a diagram illustrating simulation results of a motion vector detection device according to the present invention.
Figure 17:
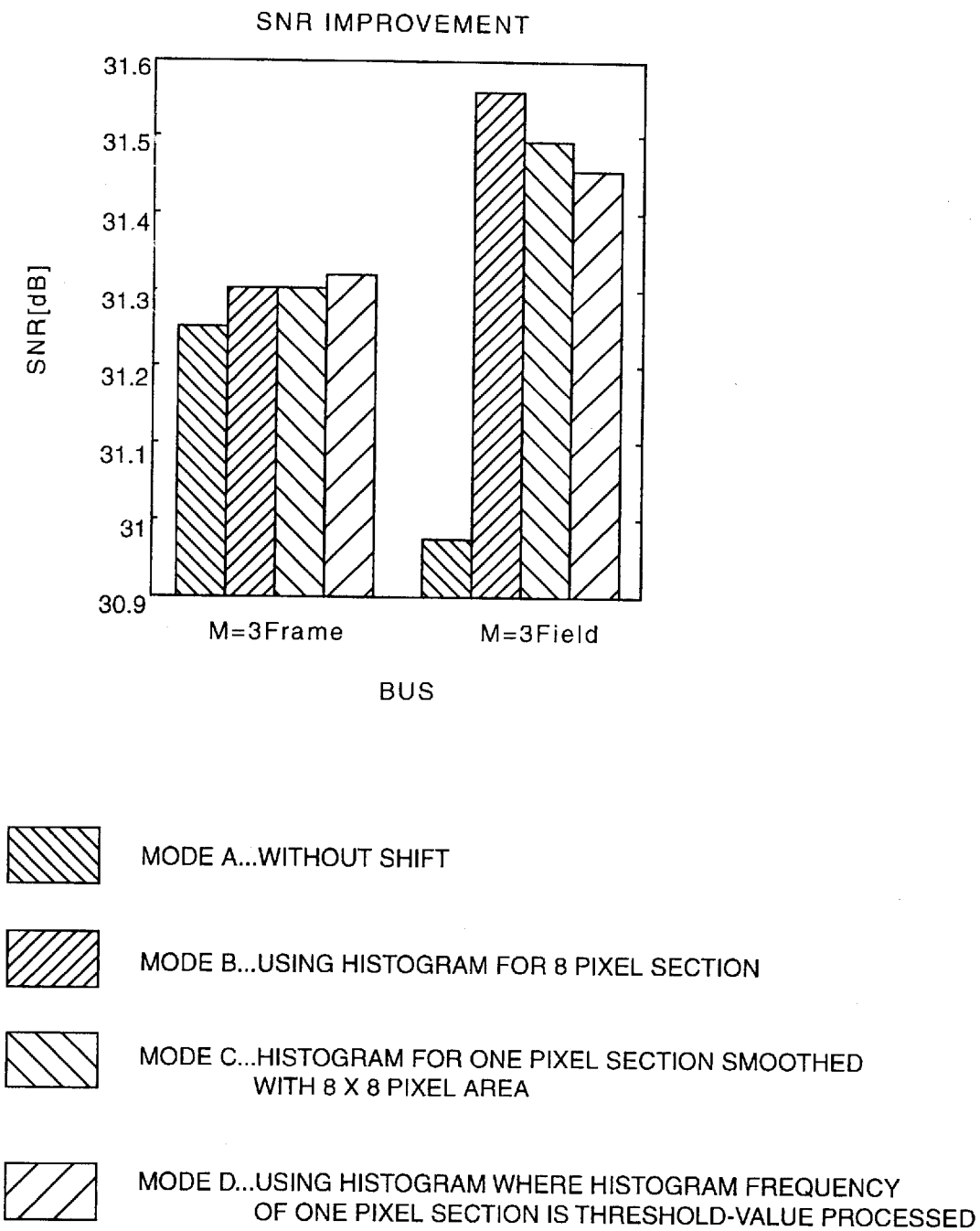
FIG. 17 is a diagram illustrating simulation results of a motion vector detection device according to the present invention.
Figure 18:
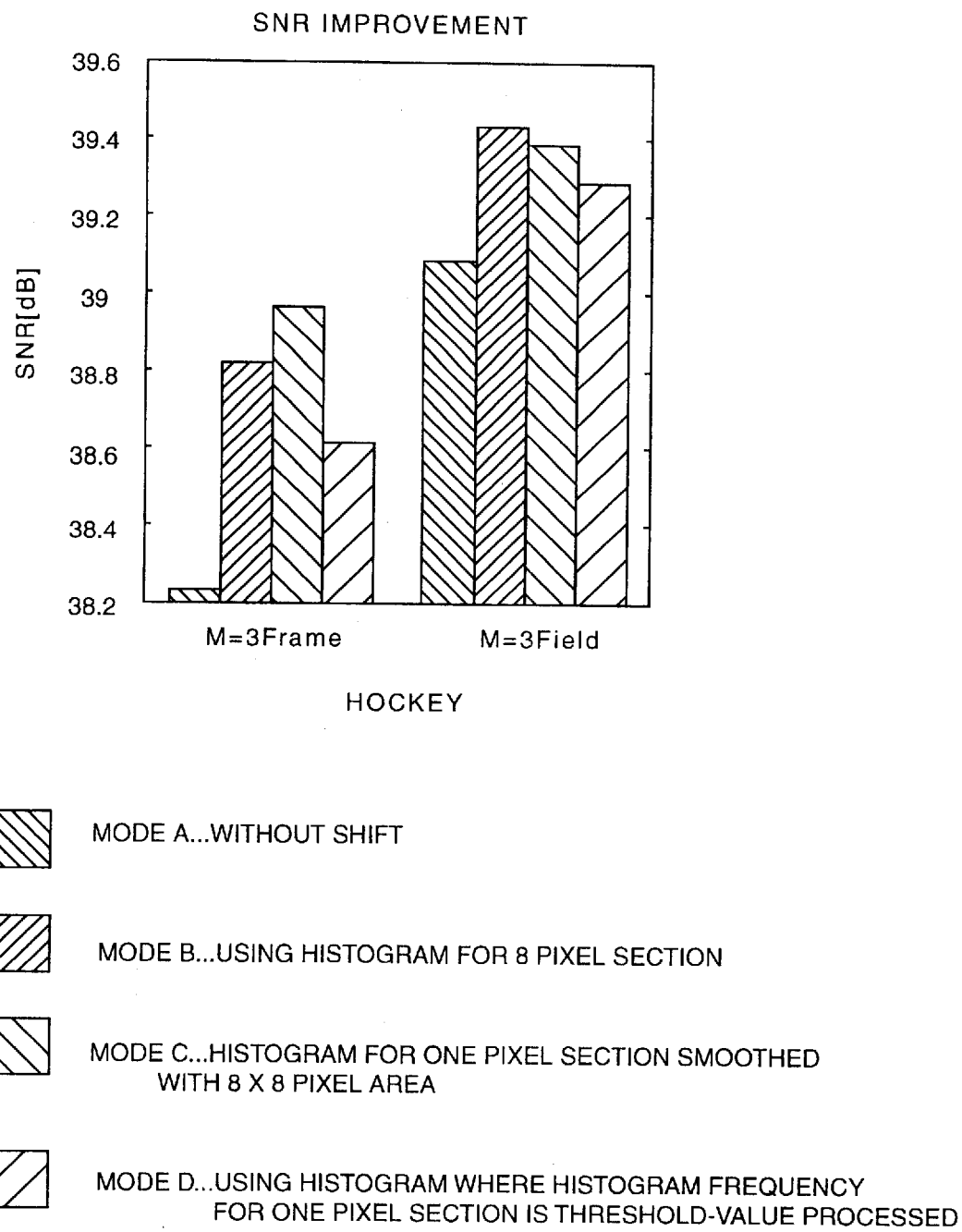
FIG. 18 is a diagram illustrating simulation results of a motion vector detection device according to the present invention.
Figure 19:
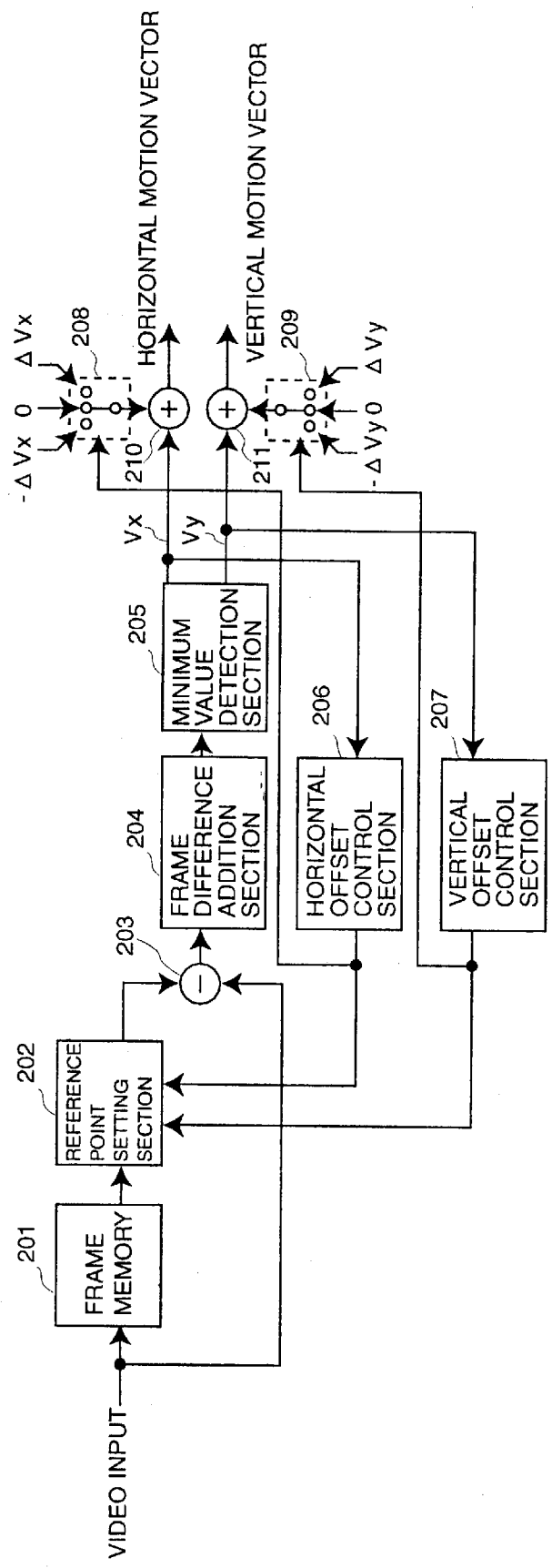
FIG. 19 is a block diagram illustrating the configuration of a motion vector detection device according to the related art 1.
Figure 20:
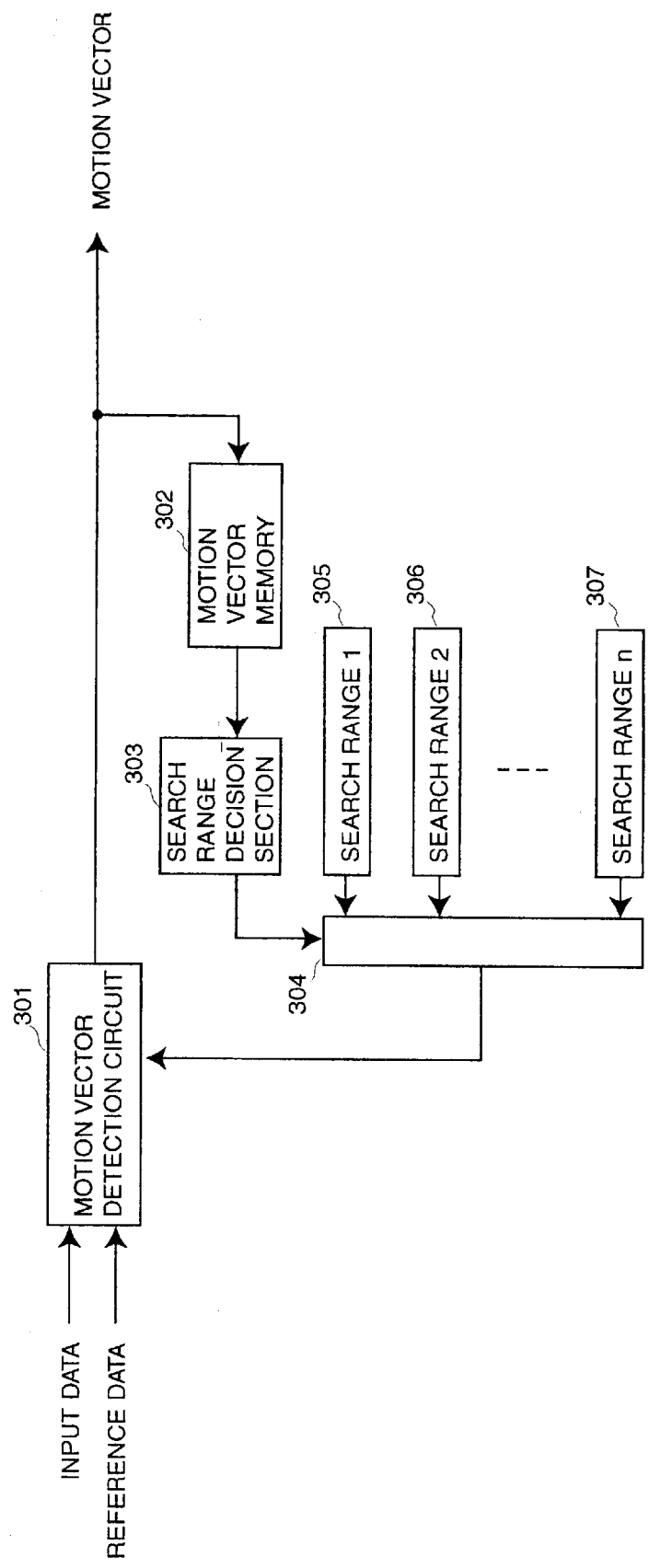
FIG. 20 is a block diagram illustrating the configuration of a motion vector detection device according to the related art 2.
Figure 21:
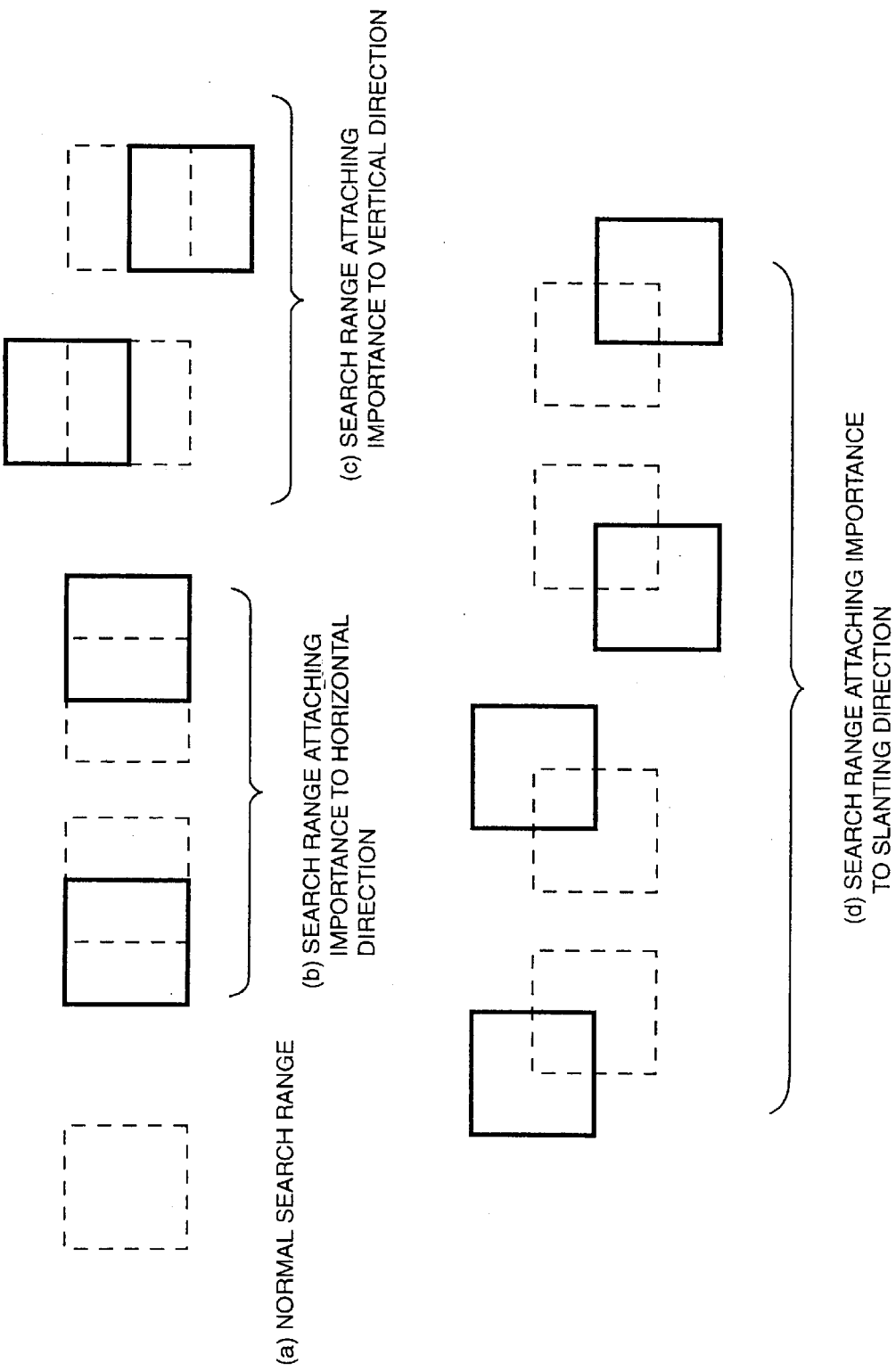
FIG. 21 is a diagram explaining a motion vector search range of a motion vector detection device according to the related art 2.

FIGS. 16 to 18 are bar graphs showing simulation results of the motion vector detection device according to the embodiment and the modifications. FIG. 16 shows the results obtained by encoding a fast moving image of a carousel; FIG. 17 shows the results obtained by encoding a fast moving image of a bus; and FIG. 18 shows the results obtained by encoding a fast moving image in hockey.

In the bar graphs shown in FIGS. 16 to 18, the left group shows the case where images are encoded in frame units while the right group shows the case where an image are encoded in field units. In the simulation conditions, it is assumed that a normal search range of vector values of a motion vector is −48.0, 0 to +47.0 pixels in the horizontal direction and 16.0 and 0 to +15.5 pixels in the vertical direction and that motion vectors are detected with an accuracy of 0.5 pixels. The encoding is performed at a bit rate of 4 Mbit/sec.

Referring to FIGS. 16 to 18, the motion vector value is fixed to a normal search range in the mode A. In the mode B, a histogram is created within 8 horizontal segments and 8 vertical segments by using the motion vector detection device shown in FIG. 2. In the mode C, the smoothing process is performed by summing frequencies within the 8×8 pixel segments from a histogram within one pixel segment, using the motion vector detection device shown in FIG. 16. In the mode D, a threshold process is performed to the histogram within one pixel segment.

As the simulation results show, the motion vector detection devices according to the embodiments and their modifications of the present invention can detect large motion vectors by shifting a search range of vector values of a motion vector. For that reason, it is understood that when a search range is not shifted, the S/N ratio becomes high even to a moving image as fast as the motion vector cannot be detected.

As described above, according to the present invention, the search range of vector values of a motion vector to be detected in the next frame is determined by performing a statistical process to a motion vector detected every frame. Consequently, the vector value of a motion vector to be detected in the next frame can be adequately predicted, so that the motion vector can be properly detected. Moreover, the limited motion vector search range allows the motion vector computational complexity to be reduced.

The entire disclosure of Japanese Patent Application No. 10-008975 filed on Jan. 20, 1998 including specification, claims, drawing and summary are incorporated herein by reference in its entirety.

What is claimed is:

1. A motion vector detection device comprising:
    motion vector detection means for dividing image data on a current frame into predetermined regions, matching the image data on said current frame with reference image data every divided region, and detecting motion vectors with vector values within a search range externally indicated;
    motion vector frequency storage means for classifying the motion vectors within each divided region detected by said motion vector detection means under the vector value range and then storing the number of the motion vectors; and
    indication means for indicating a search range of vector values of a motion vector to be detected by the motion vector detection mean, based on the number of the motion vectors classified and stored by said motion vector frequency storage means;
    wherein the time interval between said reference image data and image data for said current frame differs for each frame; and wherein said indication means indicates a motion vector value search range according to a time interval between said reference image data and image data for said current frame.

2. The motion vector detection device of claim 1, wherein said motion vector frequency storage means classifies motion vectors within each divided region detected by said motion vector detection means so as to contain the vector values of plural motion vectors within one range and then stores the number of the motion vectors.

3. The motion vector detection device of claims 1, further comprising storage control means for incrementing the number corresponding to a range containing said detected vector value among motion vector numbers stored in said motion vector frequency storage means every time said motion vector detection means detects the vector value of a motion vector in each of each divided region.

4. The motion vector detection device of claims 1, wherein said indication means indicates the motion vector search range so as to center a vector value corresponding to the maximum number among the motion vector numbers classified and stored by said motion vector frequency storage means.

5. The motion vector detection device of claim 1, wherein said indication means indicates a motion vector search range based on numbers larger than a predetermined threshold value among the motion vector numbers classified and stored in said motion vector frequency storage means.

6. The motion vector detection device of claims 1, further comprising correction means for correcting a motion vector number stored in said motion vector frequency storage means; and wherein said indication means indicates a motion vector search range to be detected by said motion vector detection means, based on the motion vector number corrected by said correction means.

7. The motion vector detection device of claims 6, wherein said correction means includes means for correcting the number corresponding to a classification containing a motion vector with the vector value of (0, 0), among motion vector numbers stored in said motion vector frequency storage means.

8. The motion vector detection device of claim 6, wherein said correction means includes means for smoothing the motion vector numbers classified and stored in said motion vector frequency storage means within close vector value ranges by classification.

9. The motion vector detection device of claims 6, wherein said indication means indicates said motion vector search range so as to center the vector value corresponding to a classification having the largest motion vector among classifications containing the motion vector number corrected by said correction means.

10. The motion vector detection device of claims 6, wherein said indication means indicates a motion vector value search range based on numbers with a larger value than a predetermined threshold value among the motion vector numbers corrected by said correction means.

11. The motion vector detection device of claim 1, wherein said reference image data comes before and after image data for said current frame; and wherein said motion vector frequency storage means includes means for adjusting vector values of motion vectors detected by said motion vector detection means to provide a different sign when said reference image data comes before or after image data for said current frame.

12. The motion vector detection device of claim 1, wherein said motion vector detection means can detect plural motion vectors from each of divided regions; and wherein said motion vector frequency storage means assigns weights to motion vector numbers detected from each divided region by said motion vector detection means an d then stores the weighted motion vector numbers.

13. A motion vector detecting method comprising:

a vector motion detection step of dividing image data for a current frame into predetermined regions, matching the image data of said current frame with reference image data every divided region; and detecting a motion vector with a vector value within a search range externally indicated;

a motion vector distribution creation step of creating a distribution where motion vectors detected from each divided region in said motion vector detection step are classified every range of predetermined vector values; and an indication step of indicating a motion vector value search range to be detected in the motion vector detection, based on said distribution created in said distribution creation step;

wherein the time interval between said reference image data and image data for said current frame differs for each frame; and wherein said indicating step indicates a motion vector value search range according to a time interval between said reference image data and image data for said current frame.

14. A motion vector detection device comprising:

motion vector detection means for dividing image data on a current frame into predetermined regions, matching the image data on said current frame with reference image data every divided region, and detecting motion vectors with vector values within a search range externally indicated;

motion vector frequency storage means for classifying the motion vectors within each divided region detected by said motion vector detection means under the vector value range and then storing the number of the motion vectors;

indication means for indicating a search range of vector values of a motion vector to be detected by the motion vector detection mean, based on the number of the motion vectors classified and stored by said motion vector frequency storage means; and correction means for correcting a motion vector number stored in said motion vector frequency storage means; and wherein said indication means indicates a motion vector search range to be detected by said motion vector detection means, based on the motion vector number corrected by said correction means;

wherein said correction means includes means for smoothing the motion vector numbers classified and stored in said motion vector frequency storage means within close vector value ranges by classification.

15. A motion vector detection device comprising:

motion vector detection means for dividing image data on a current frame into predetermined regions, matching the image data on said current frame with reference image data every divided region, and detecting motion vectors with vector values within a search range externally indicated;

motion vector frequency storage means for classifying the motion vectors within each divided region detected by said motion vector detection means under the vector value range and then storing the number of the motion vectors; indication means for indicating a search range of vector values of a motion vector to be detected by the motion vector detection mean, based on the number of the motion vectors classified and stored by said motion vector frequency storage means; and correction means for correcting a motion vector number stored in said motion vector frequency storage means; and wherein said indication means indicates a motion vector search range to be detected by said motion vector detection means, based on the motion vector number corrected by said correction means;

wherein said indication means indicates said motion vector search range so as to center the vector value corresponding to a classification having the largest motion vector among classifications containing the motion vector number corrected by said correction means.

* * * * *